3,143,557
SUBSTITUTED 19-NORANDROSTA-5(10),9(11)-DI-
ENES AND METHOD OF PREPARING SAME
John Johnston Brown, Pearl River, and Seymour Bernstein, New City, N.Y., assignors to American Cyanamid Company, Stamford, Conn., a corporation of Maine
No Drawing. Filed Aug. 27, 1963, Ser. No. 304,975
7 Claims. (Cl. 260—397.5)

This invention relates to new steroid compounds. More particularly, it relates to 19-norandrosta-5(10),9(11)-dien-3-ols and methods of preparing the same.

The new steroids of the present invention may be illustrated by the following structural formula:

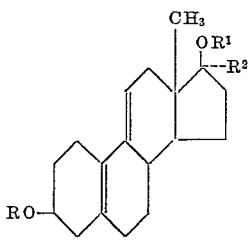

wherein R and $R^1$ are selected from the group consisting of hydrogen and lower alkanoyl and $R^2$ is selected from the group consisting of hydrogen, methyl, vinyl, ethynyl, chloroethynyl and when $R^2$ is hydrogen then $R^1$ is lower alkanoyl.

The compounds of this invention are, in general, white crystalline solids, relatively insoluble in water but soluble in organic solvents such as lower alkanols, ethyl acetate, acetone, tetrahydrofuran, methylene chloride and the like.

The compounds of this invention may be prepared by reduction of the corresponding 3-ketosteroid with a metal borohydride such as sodium or lithium borohydride. Ordinarily, the reduction is carried out in an appropriate solvent such as a lower alkanol at approximately room temperature. Under such conditions the reaction is substantially complete after an hour, more or less, and the steroid diol may be recovered by conventional methods well known in the art.

The 3-esters of the diols may be prepared from the diols by conventional methods. Those diols unsubstituted at the 17-position (i.e. wherein $R^2$ is hydrogen) ordinarily esterify at both the 3- and the 17-positions to yield 3,17-diesters whereas the other diols generally yield 3-monoesters.

In order to prepare the starting materials of this invention, the intermediates are reacted with an orthoformate ester in a solvent at from about 10° to about 50° C. The orthoformate ester can be, for example, methyl orthoformate, ethyl orthoformate and the like. The solvents can be, for example, lower alkyl alcohols such as methanol, ethanol, propanol, etc. Also, 1,4-dioxane-alcohol solvent mixture can be used as well as an excess of orthoformic ester. The reaction product is hydrolyzed with a strong acid such as, for example, sulfuric, hydrochloric, p-toluene-sulfonic, perchloric acids or the like. The starting materials are preferably recovered from the reaction mixture following hydrolysis by dilution with water and separation of the precipitate by filtration. The product is further purified by crystallization and recrystallization, if desired.

The new steroids of this invention have shown effectiveness in lowering blood cholesterol in animal tests and hence are useful in treating hypercholesteremia.

The present compounds can be incorporated with fillers, excipients, flavors, etc. and formulated into tablets, capsules, pills and other pharmaceutical forms well known in the compounding arts.

The following examples illustrate in detail the preparation of representative 19-norandrostadienes of the present invention.

EXAMPLE I

*Preparation of 19-Norandrosta-5(10),9(11)-Diene-3β,17β-Diol*

17β-hydroxy-19-norandrosta-4,9(10)-dien-3-one is prepared by the method described in J. Am. Chem. Soc., 82, 2402 (1960). p-Toluenesulfonic acid (100 mg.) is added to a solution of 17β-hydroxy-19-norandrosta-4,9(10)-dien-3-one (200 mg.) in methanol (4 ml.), methylene chloride (4 ml.) and methyl orthoformate (4 ml.). After 10 minutes pyridine (2 ml.) is added followed by methylene chloride. The mixture is washed with water and dried and the gum obtained by removal of solvent is dissolved in petroleum ether and chromatographed on a synthetic magnesium silicate (10 g.). The gum eluted with 1% acetone in petroleum ether is dissolved in acetone (6 ml.) and dilute sulfuric acid (3 drops; 8% v./v.) is added. After 5 minutes the solution is diluted with water and the mixture is kept in the cold for 1 hour. The material which has separated is collected, dried and crystallized from acetone-petroleum ether to give 17β-hydroxy-19-norandrosta-5(10),9(11)-dien-3-one as needles (90 mg.) melting point about 100–118° C.

To a solution of 500 mg. of 17β-hydroxy-19-norandrosta-5(10),9(11)-dien-3-one in 25 ml. of ethanol is added 500 mg. of sodium borohydride and the mixture is stirred at room temperature for one hour. Water is then added and the product is extracted in methylene chloride which is then washed with water and dried. The residue obtained by evaporation of solvent is crystallized from aqueous methanol and then from acetone-n-hexane to give 300 mg. of product, melting point 164°–167° C.

Acetylation of the product of the example in pyridine with acetic anhydride at room temperature gives the corresponding 3,17-diacetate.

EXAMPLE II

*Preparation of 17αMethyl-19-Norandrosta-5(10),9(11)-Diene-3β-17β-Diol*

17β - hydroxy - 17α - methyl-19-norandrosta-4,9(10)-dien-3-one [J. Am. Chem. Soc., 82, 2402 (1960)] is treated as in Example I above to give the product 17β-hydroxy-17α-methyl-19-norandrosta - 5(10),9(11) - dien-3-one.

A solution of 1.0 g. of 17β-hydroxy-17α-methyl-19-norandrosta-5(10),9(11)-dien-3-one in 50 ml. of ethanol is treated with 1.0 g. of sodium borohydride and the mixture is stirred at room temperature for one hour. The mixture is diluted with water and the product, isolated by extraction in methylene chloride, is crystallized from acetone-n-hexane to give 780 g. of melting point 150°–155° C. Recrystallization of this product raises the melting point to 157°–162° C.

Acetylation of the product of the example in pyridine with acetic anhydride at room temperature produces the corresponding 3-acetate.

EXAMPLE III

*Preparation of 17α-Ethynyl-19-Norandrosta-5(10),9(11)-Diene-3β,17β-Diol*

Five hundred milligrams of sodium borohydride is added to a solution of 500 mg. of 17α-ethynyl-17β-hydroxy-19-norandrosta-5(10),9(11)-dien-3-one [Steroids, 1, 113 (1963)] in 25 ml. of ethanol and the mixture is stirred at room temperature for one hour. The mixture is diluted with water and the product which separates is collected, washed with water, and dried. Crystallization from aqueous methanol gives 460 mg. of product, melting point 158°–162° C.

We claim:

1. A compound of the formula:

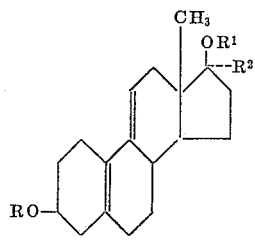

wherein R and R¹ are selected from the group consisting of hydrogen and lower alkanoyl and R² is selected from the group consisting of hydrogen, methyl, vinyl, ethynyl, chloroethynyl and when R² is hydrogen then R¹ is lower alkanoyl.

2. The compound 17α - methyl - 19 - norandrosta-5(10),9(11)-diene-3β,17β-diol.

3. The compound 19-norandrosta-5(10),9(11)-diene-3β,17β-diol.

4. The compound 17α - ethynyl - 19 - norandrosta-5(10),9(11)-diene-3β,17β-diol.

5. The compound 17α - methyl - 19 - norandrosta-5(10),9(11)-diene-3β,17β-diol 3-acetate.

6. The compound 19-norandrosta-5(10),9(11)-diene-3β,17β-diol 3,17-diacetate.

7. The compound 17α - ethynyl - 19 - norandrosta-5(10),9(11)-diene-3β,17β-diol 3-acetate.

References Cited in the file of this patent

UNITED STATES PATENTS 3,052,672    Nomine et al.    Sept. 4, 1962

OTHER REFERENCES

Fieser et al.: "Steroids" 1959, pp. 268, 270, 684, Reinhold Publishing Corp., New York, New York.